United States Patent
Monroe

[15] 3,670,189
[45] June 13, 1972

[54] GATED PERMANENT MAGNET MOTOR

[72] Inventor: Paul Peter Monroe, 109 East San Antonio Drive, Long Beach, Calif. 90807

[22] Filed: April 30, 1971

[21] Appl. No.: 138,891

[52] U.S. Cl............................310/46, 310/152, 310/181, 310/231
[51] Int. Cl..........................................H02k 23/04
[58] Field of Search................310/152, 154, 181, 155, 46, 310/27, 231, 235, 232

[56] References Cited

UNITED STATES PATENTS

| | | | |
|---|---|---|---|
| 278,120 | 5/1883 | Fuller | 310/231 X |
| 491,106 | 2/1893 | Hicks | 310/128 |
| 1,863,294 | 6/1932 | Bogia | 310/46 |
| 2,334,153 | 11/1943 | Wilson | 310/46 |
| 3,238,397 | 3/1966 | Maness | 310/27 |

Primary Examiner—D. X. Sliney

[57] ABSTRACT

A self-starting permanent magnet motor, particularly a type which will operate on batteries, or alternate half cycle current, consisting of a fore and aft stator assembly. Both fore and aft stator assemblies embody an identical number of permanent magnets of preferred ceramic material and high permeability soft iron inductors, combined into hybrid magnetic poles. A multi-pole permanent magnet rotor, having permanently fixed north and south poles is sandwiched between the fore and aft stator assemblies on a rotatable shaft. The rotor is caused to rotate, due to a gating action which alternates the poles one complete cycle with each transverse passing of the rotor poles between the stator poles. Because of this action, fifty per cent of the energy required to do a specific amount of work is derived from the peak energy product of the permanent magnets.

6 Claims, 18 Drawing Figures

INVENTOR
Paul F. Monroe

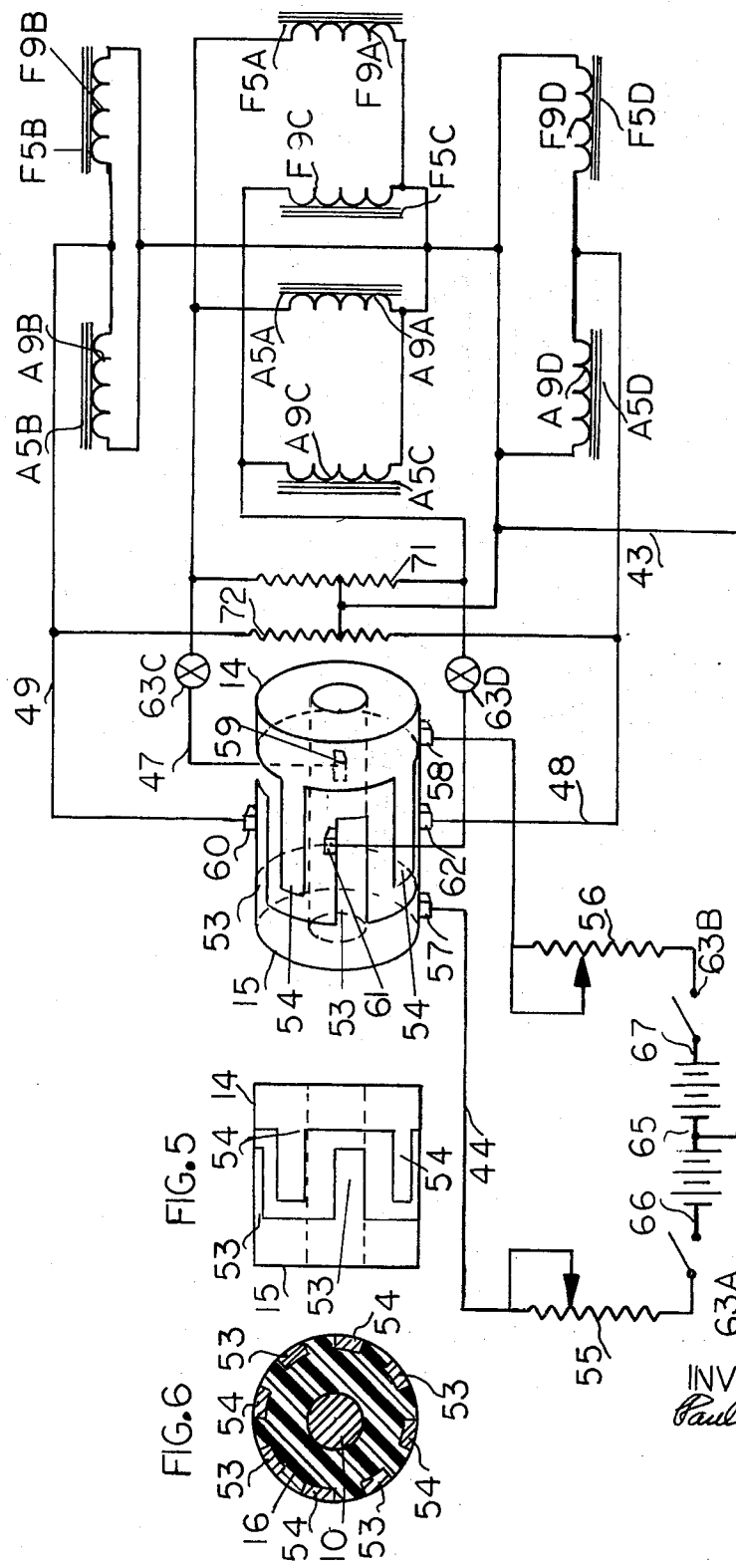

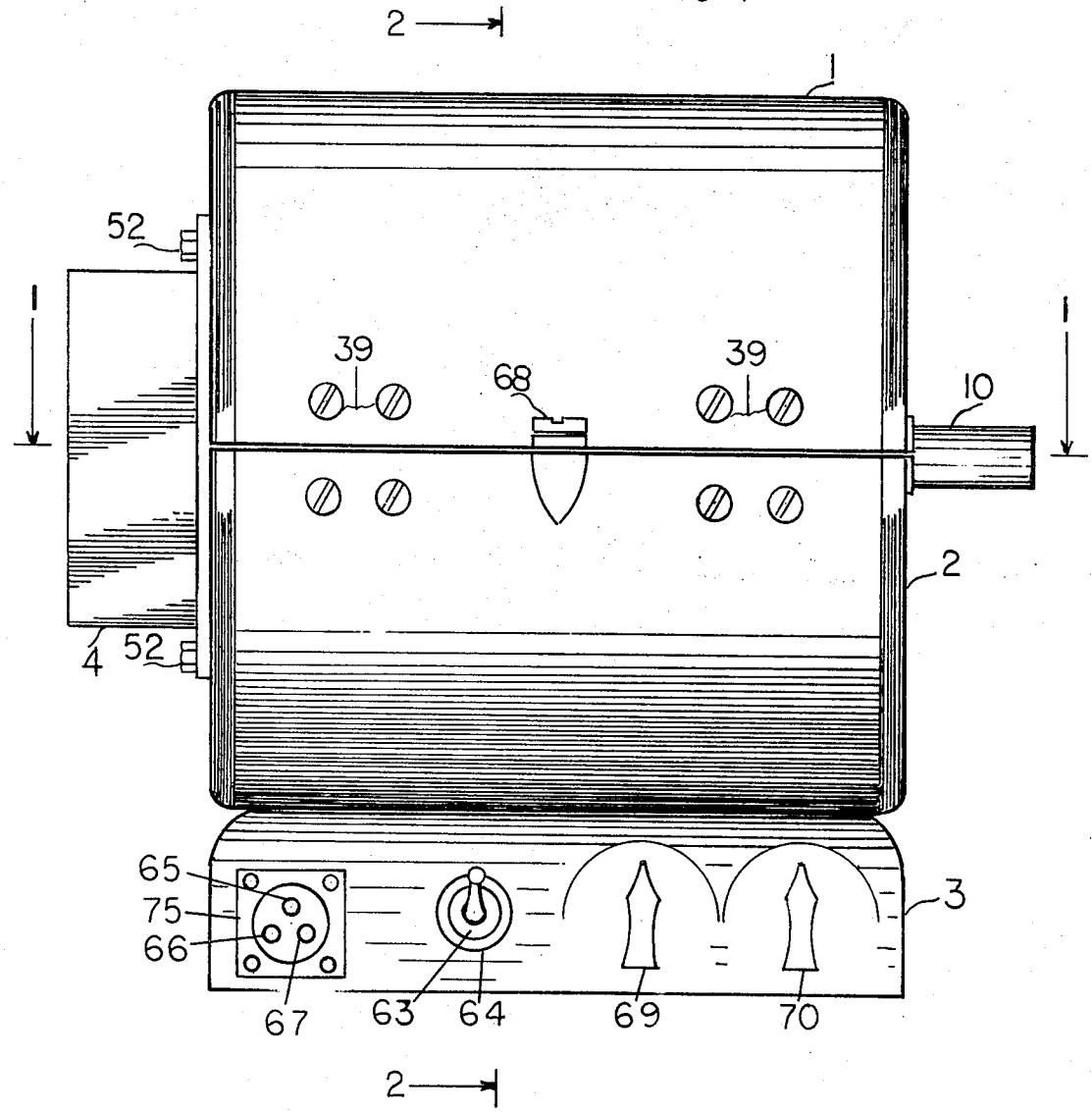

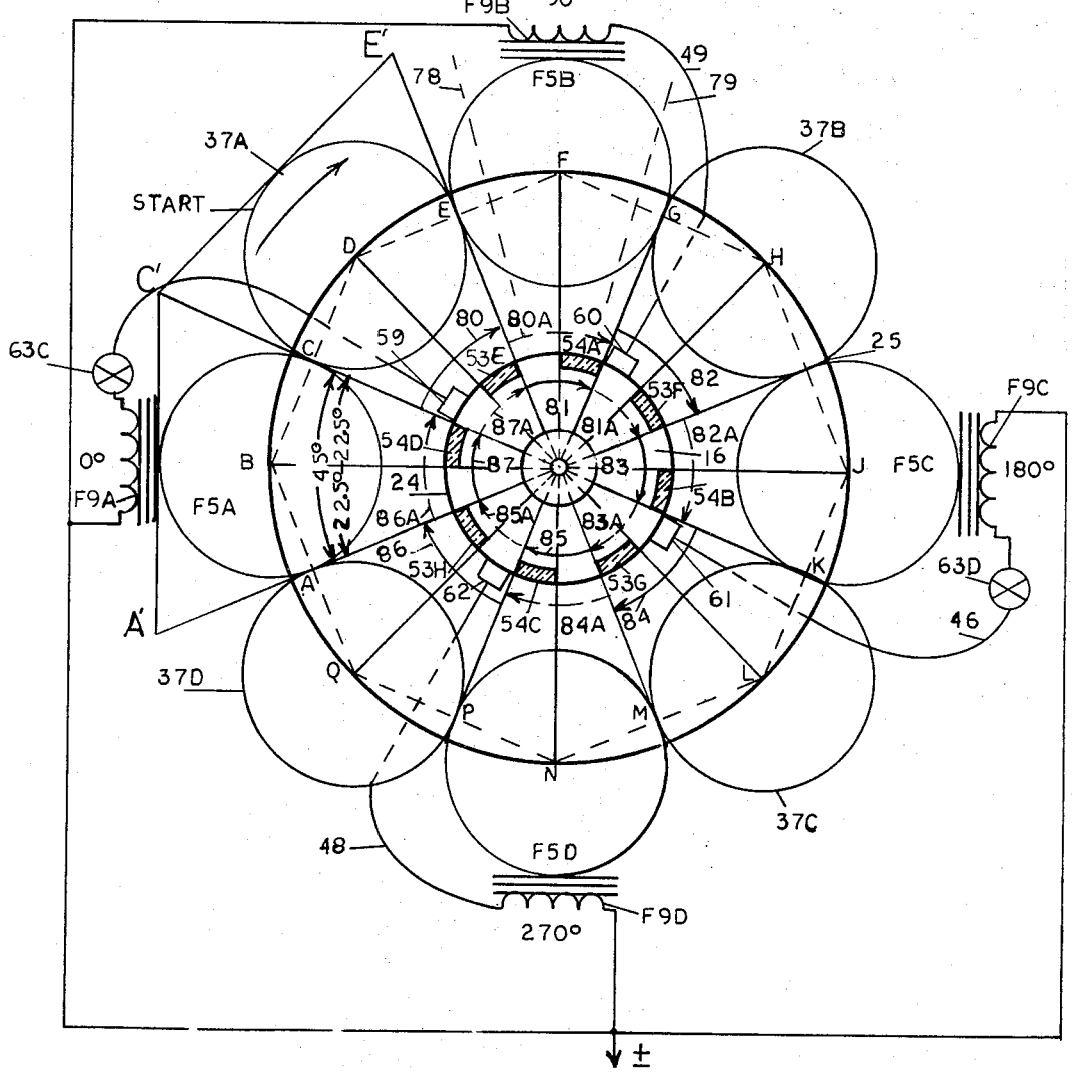
FIG. 8
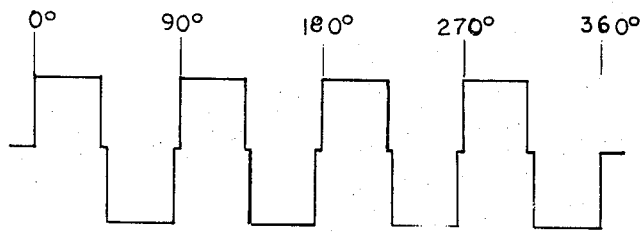
FIG. 8-I

GATED PERMANENT MAGNET MOTOR

The invention relates to a high torque, high efficiency gated permanent magnet motor, particularly a type which will operate from batteries or alternate half cycle current, consisting of split stator sections wherein permanent magnets and electromagnets are arranged in a series configuration to furnish the required magnetic flux to drive a multi-pole permanent magnet rotor coupled through a center shaft to an external load.

In general, at the present time, permanent magnet rotors are used in miniature electric motors, or as field pieces in small fractional horse power motors.

The purpose of my invention is to demonstrate the fundamental principles wherein permanent magnets and electromagnets are employed in a series of hybrid magnetic configurations as stator poles in the following gated permanent magnet motors;

1. Split stators with a permanent magnet rotor.
2. Conventional stator pole configuration with a coaxially placed permanent magnet rotor.
3. Linear action push-pull reciprocating motor, with a permanent magnet armature.

In these motors 50 percent of the driving force will be supplied by the peak energy of the permanent magnets, while the electromagnets or gating coils will furnish the difference of the required input energy from an external power source.

The motors described herein are particularly adaptable for propulsion of automobiles, since the design readily lends itself for sectionalized multi-pole construction with large horse power output, at a moderate size and weight, with a very economical operation and maintenance cost.

From the aforesaid it is understood that the object of this invention is to provide a high torque, high efficiency gated permanent magnet motor, particularly for the propulsion of vehicles and for industrial application with capacities ranging from a fraction of a horse power to hundreds of horse powers.

Another object of this invention is to provide a variable speed, self starting motor for general applications.

Still a further object of this invention is to provide an alternate polarity effect in the external flux of the permanent magnet stator poles, from zero to hundreds of alternations per second, by electromechanical means, namely gating.

BRIEF DESCRIPTION OF THE DRAWINGS

FIG. 4 is the electrical schematic of the embodiment illustrating the gating and control circuitry.

FIG. 5 is a partial development of the gating module showing the slip ring and gating segments.

FIG. 6 depicts the distribution of the gating segments taken on line 1—1 of FIG. 4.

FIG. 7 illustrates the exterior of the motor.

FIG. 8 is a simplified schematic for the illustration of the relationship between the stator poles, rotor poles, and the gating module in the theory and operation of the motor.

FIG. 8-1 illustrates the voltage wave form across the eight gating coils for one revolution.

FIG. 13 is the developed view of slip rings and gating segments.

Figure 9:
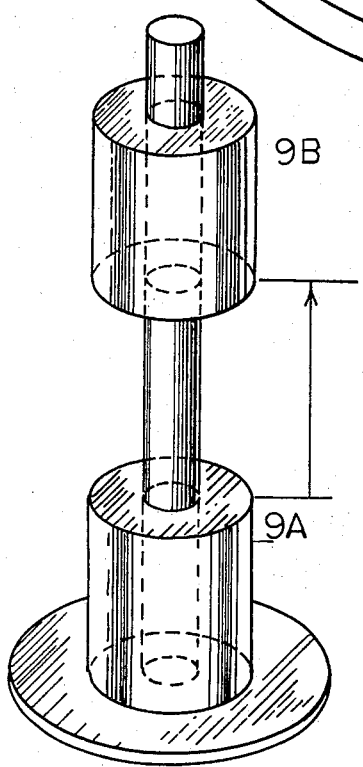
FIG. 9 is the experimental model used to demonstrate the effect of the reactive forces between two stacks of permanent magnets and their like poles.
Figures 10, 11:
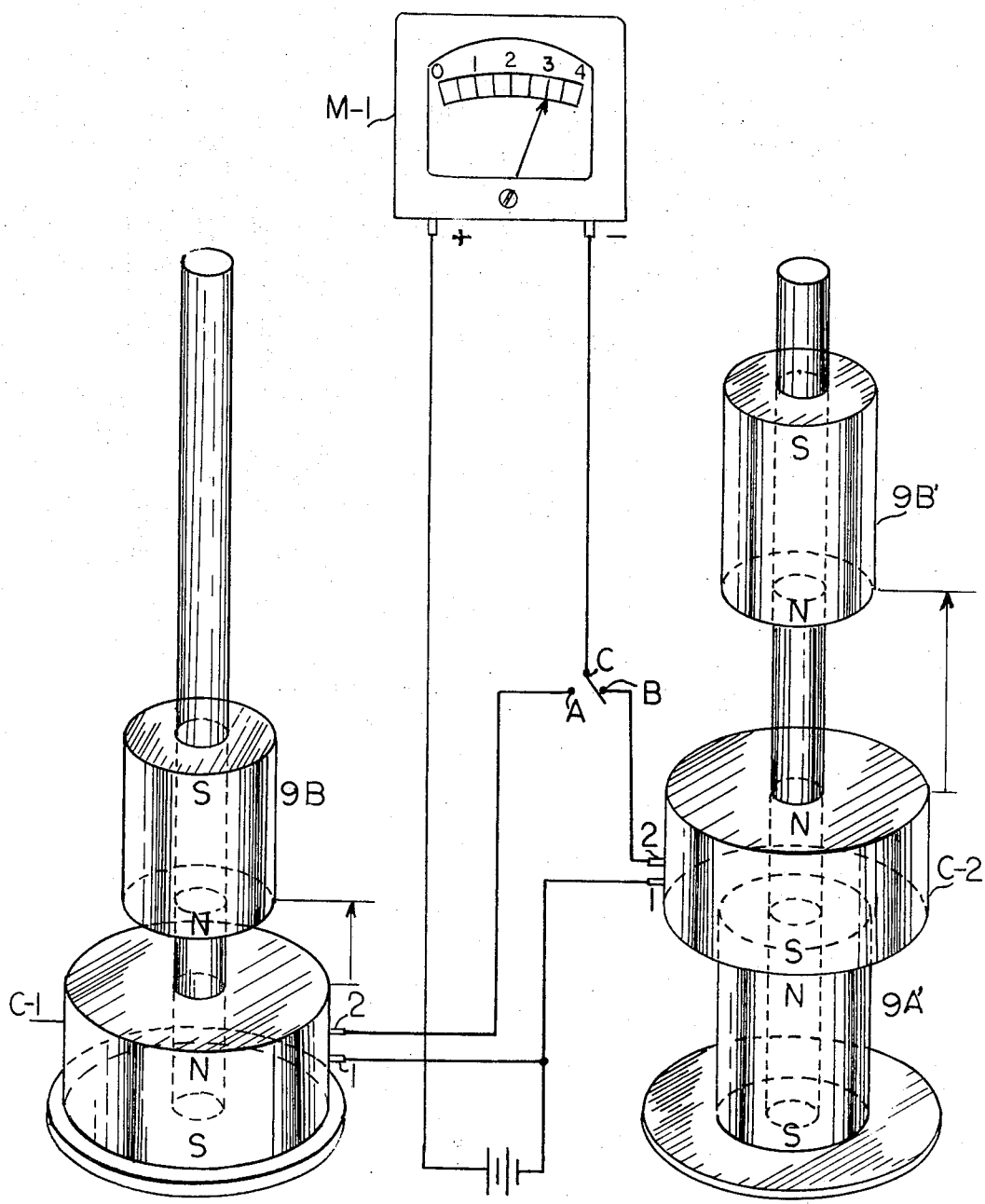
FIG. 10 is the experimental model used to demonstrate the effects of the reactive forces between an electromagnet and a permanent magnet when the like poles are brought together.
FIG. 11 is the experimental model used to demonstrate the gating action when an electromagnet is placed between two permanent magnets.
Figure 12:
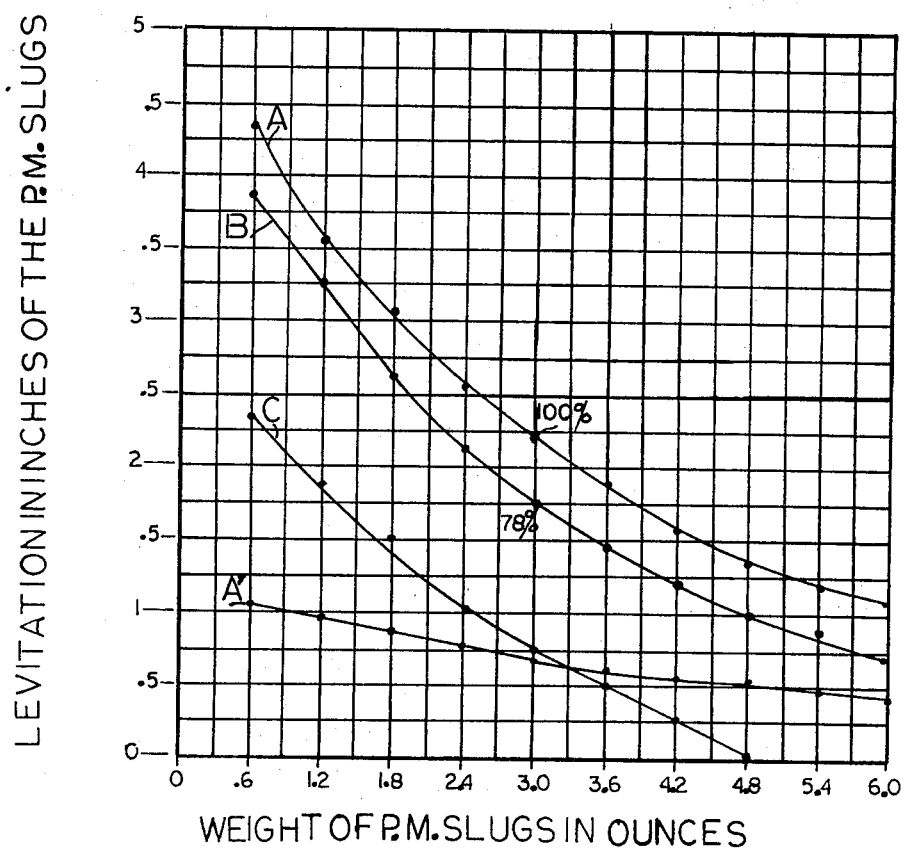
FIG. 12 depicts the dynamic response curves of the experiments in FIGS. 9, 10, and 11.

The governing principle of my invention will be better understood upon analysis of drawings and dynamic response curves. More specifically as illustrated in FIGS. 9, 10, and 12. The function and application of this revolutionary principle to do work will now be explained.

In FIG. 9, the two stacks of ceramic magnets designated 9A and 9B, consists of identically magnetized segments, but varies in the number of segments per stack. Each segment contains the same unit mass and peak energy. Stack 9A consists of seven segments, while stack 9B consists of five segments, weighing a total of 3 ounces, or 0.6 of an ounce per segment. When 9B is placed over and above 9A, as shown in FIG. 9, with like poles facing each other, if 9B is forced down until it is in contact with 9A, then the downward force suddenly removed, the mutually reactive forces will eject 9B to a peak height of 2 ⅛ inches as seen in FIG. 9.

In FIGS. 10 and 11, the gating of the magnetic flux and its effects as pertain to the invention is demonstrated. In FIG. 10, magnetic stack 9B is placed over gating coil C-1. The terminals of gating coils C-1 and C-2 are connected up to verify the governing principle of my invention in the following manner: Terminal 1 of C-1 and C-2 are connected to the negative terminal of the battery; the positive terminal is connected to the positive terminal of milliammeter M-1. The negative terminal of M-1 is connected to C, the common terminal of double throw single pole switch SW-1. Terminal A, of SW-1,is connected to terminal 2, of C-1, while terminal B of SW-1 is connected to terminal 2, of C-2.

By referring to FIG. 10, it will be observed that with the closure of SW-1, C-1 is gated as indicated by the current reading of 300 ma on M-1. Before gating coil C-1 was energized, permanent magnet 9B was resting, and magnetically locked on to C-1 Upon gating, stack 9B was ejected to a peak height of five-eighths of an inch due to the repulsion between C-1 and 9B.

In FIG. 11, permanent magnet stack 9A' is placed under gating coil C-2,and permanent magnet stack 9B' is placed on top of C-2. With that, the single pole double throw switch SW-1 is switched from contact A to contact B, thus transferring the gating current from C-1 to C-2, causing the ejection of stack 9B' to a peak height of 1½ inches. The indicated gain has been accomplished without increasing the gating current. Gating coil C-1 and C-2,magnetic stacks 9B and 9B' are one and the same. In FIG. 11, we added permanent magnet stack 9A', and that is the only difference between FIGS. 10 and 11. Here I have accomplished the following:

1. In FIG. 11, before gating, coil C-2 acts as a partial magnetic shield between 9A' and 9B', reducing the magnetic flux at the north pole face of C-2 by 80 percent.

Figure 1:
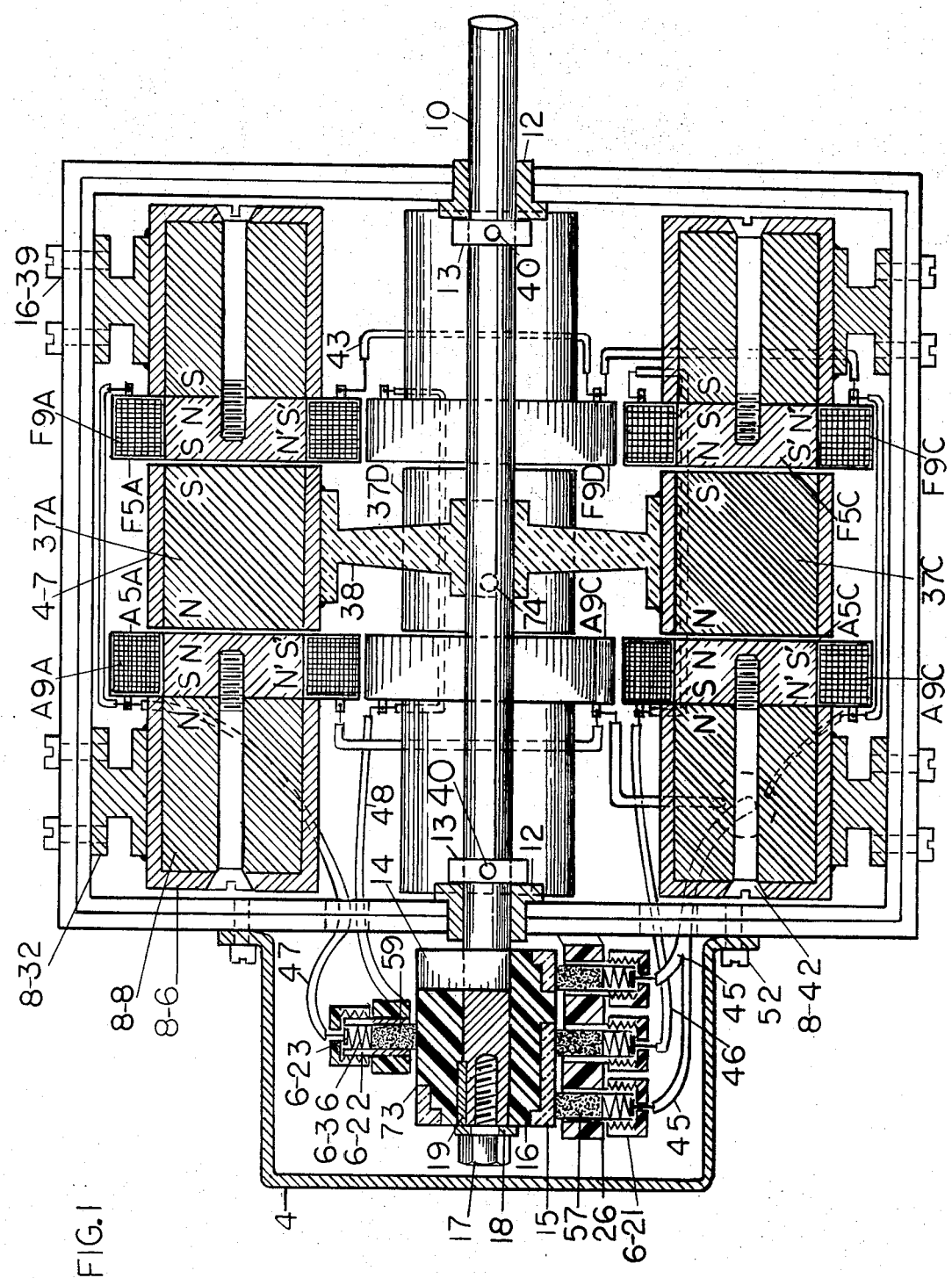
FIG. 1 is a detailed sectional view showing the lower half section of the motor, gating module and the brush holders, taken along the longitudinal axis on line 1—1, FIG. 7.

2. By applying positive gating with an input of only 0.9 watts, we obtain 100 percent neutralization of the repulsive action between 9B', which in FIG. 1 is rotor magnet 37 and C-2, which in FIG. 1 is gating coils A9, F9, and soft iron core A5 and F5. Thus, the opposing forces between the stator and rotor poles are eliminated. Instead of repulsion, now there is a mutual attraction between the stator and rotor poles.

3. By the configuration shown in FIG. 11, the main design objective to establish a ratio of 6.5:3.5, in the total flux density at the north pole piece of gating coil C-2 is accomplished by utilizing the coil dc resistance as a current limiter, such that the maximum flux developed in C–2 shall not exceed 35 percent of the total flux. Permanent magnet 9B', shown as magnet 8 in FIG. 1, will furnish 65 percent of the flux in C–2, shown as A5 and F5 in FIG. 1, by magnetic induction. This condition is the result of negative gating, which forms 9B' and C–2 into a series magnetic circuit.

A more precise understanding of the above described actions will be obtained by referring to FIG. 12. Curve A is the dynamic response curve of the experimental model illustrated in FIG. 9. Curve A was compiled in ten incremental steps, starting with an 0.6 ounce segment, and increasing it to 6 ounces in increments of 0.6 ounces. Curve A' is the levitation equilibrium curve, a state where the reactive forces between two magnetic masses overcome the gravitational pull, whereof the moveable mass becomes a free floating body within its confines. Curve C is the dynamic response curve of FIG. 10, where permanent magnet stack 9A is replaced with an electromagnet gating coil, C–1. In this experiment, the same procedure was employed, as in FIG. 9, to obtain the data. Curve B represents the data obtained from experimental model, FIG. 11. In this experiment, permanent magnet stack 9A is combined with gating coil C–2 in a series magnetic configuration, for the purpose of transferring the peak energy product of permanent magnet stack 9–A to perform work. The data was again compiled in an identical manner, as in the two previous experiments. It is quite evident that the combined output of stack 9A, and gating coil C–2, is less than the output of stack 9A and 9B. This is due to the insertion of a 3/32-inch airgap between the poles faces, to simulate the airgap between the stator and rotor poles. With an optimum coil design, it is possible to transfer 95 percent of the peak energy product of stack 9A and 9B to useful work. Another embodiment of my invention:

The gating module number 73 in FIG. 1, in conjunction with gating coils A9 and F9, permit the invention to be operated in the following three distinct modes.

MODE I: Mode I is the starting mode, in which both positive and negative gating controls, 55 and 56 in FIG. 4, are advanced in proportion with the current requirement per load.

MODE II: In Mode II, the positive gating current is reduced to the minimum amount required to maintain an optimum motor speed under load.

MODE III: In Mode III, the positive gating current is turned off, causing the motor to operate as a modified repulsion motor, during a no-load or idling phase. The three operating modes can be carried out by manual or automatic means.

The operation characteristics and other advantages inherent in this invention, will be better understood by the following analysis and detailed description of the accompanying drawings and illustrations.

STATOR DESIGN

In conventional electric motors, regardless of size, input power requirements AC or DC, single or polyphase, the stator rotor configuration is always the same. A coaxial configuration wherein the rotor is centrally located within circumferentially distributed stator poles.

Figure 16:
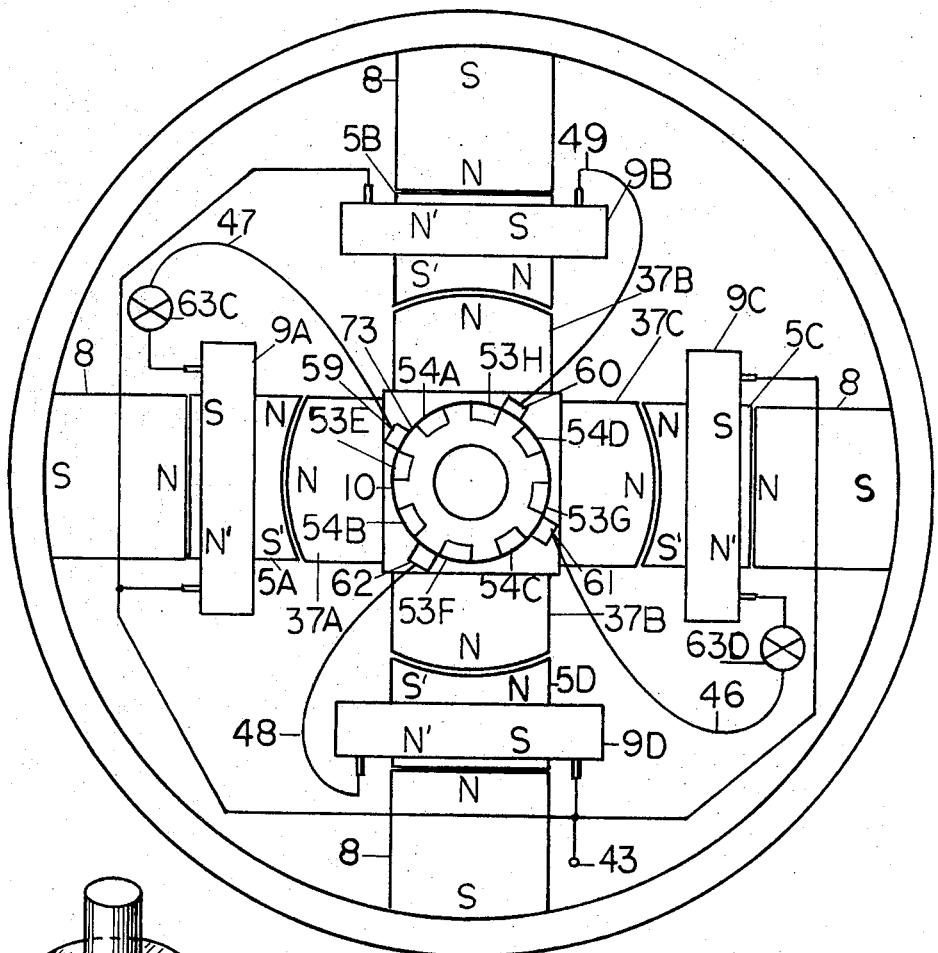
FIG. 16 illustrates a coaxial configuration of a gated permanent magnet motor.

A modified form of the above described configuration, using annular permanent magnets and annular gating cores, is shown in FIG. 16, an alternate embodiment of my invention.

In FIG. 1, a major embodiment of my invention of gated permanent magnet motors is shown. Here, my invention takes a radical departure and proceeds along a unique and revolutionary line. The stator construction of my invention will be more clearly understood by referring to FIGS. 1 and 2, wherein is shown a sectionalized stator configuration, consisting of identical fore and aft sections, having an equal number of poles, circumferentially distributed and spaced at 90° intervals; wherein the rotor is sandwiched between the fore and aft stator section. The individual stator poles consist of two main components, the permanent magnet stack 8, gating coil 9 and core 5. Stack 8 consists of seven annular ceramic magnets embedded in pod 6, a non-magnetic metal, the inside of which is coated with a compound of high strength and adhesive qualities. The electromagnet core 5 and coil 9, herein referred to as gating coil, consists of a high permeability laminated core and a dustproof, waterproof encapsulated coil. The gating coil 9, core 5, and permanent magnet 8, combined into a series configurative stator pole is held together with adhesive coating and is further secured to pod 6 by a non-magnetic bolt, 42. Pod 6 is spot welded to I-frame 32, a non-magnetic metal, then secured to casing 1 and 2, by four brass screws. There is a total of eight stator poles, having identical physical and electrical characteristics, but differing in magnetic polarity. In the longitudinal sectional view of FIG. 1, the magnetic polarity of the stator and rotor pole pieces are designated as follows: The poles polarity of permanent magnets A8, F8 and 37 are fixed and designated by capital letters N and S, while the polarity of cores A5 and F5 are designated by SN and N'S'. In a non-operative mode, and in the negative gating mode, A8 and adjacent A5 have unlike polarity. A8 has north polarity and A5 has south polarity. The polarity between A5 and rotor magnet 37 is north north, therefore the two poles will repel each other. The adjacent poles between F5 and F8 are north and south. During the positive gating mode, the polarity of F5 will change from SN to N'S', A5 will change from SN to N'S', altering the polarity between the stators and rotor from repulsion to attraction.

FIGS. 1, 2, 3, and 4 comprise the basic stator design of my invention, to be used in applications where the requirement does not exceed 10 horsepower. Above 10 horsepower, the same basic units will be assembled in cascades within a single housing, wherein each stator section embodies a rotor on a common shaft.

ROTOR CONSTRUCTION

Figure 2:
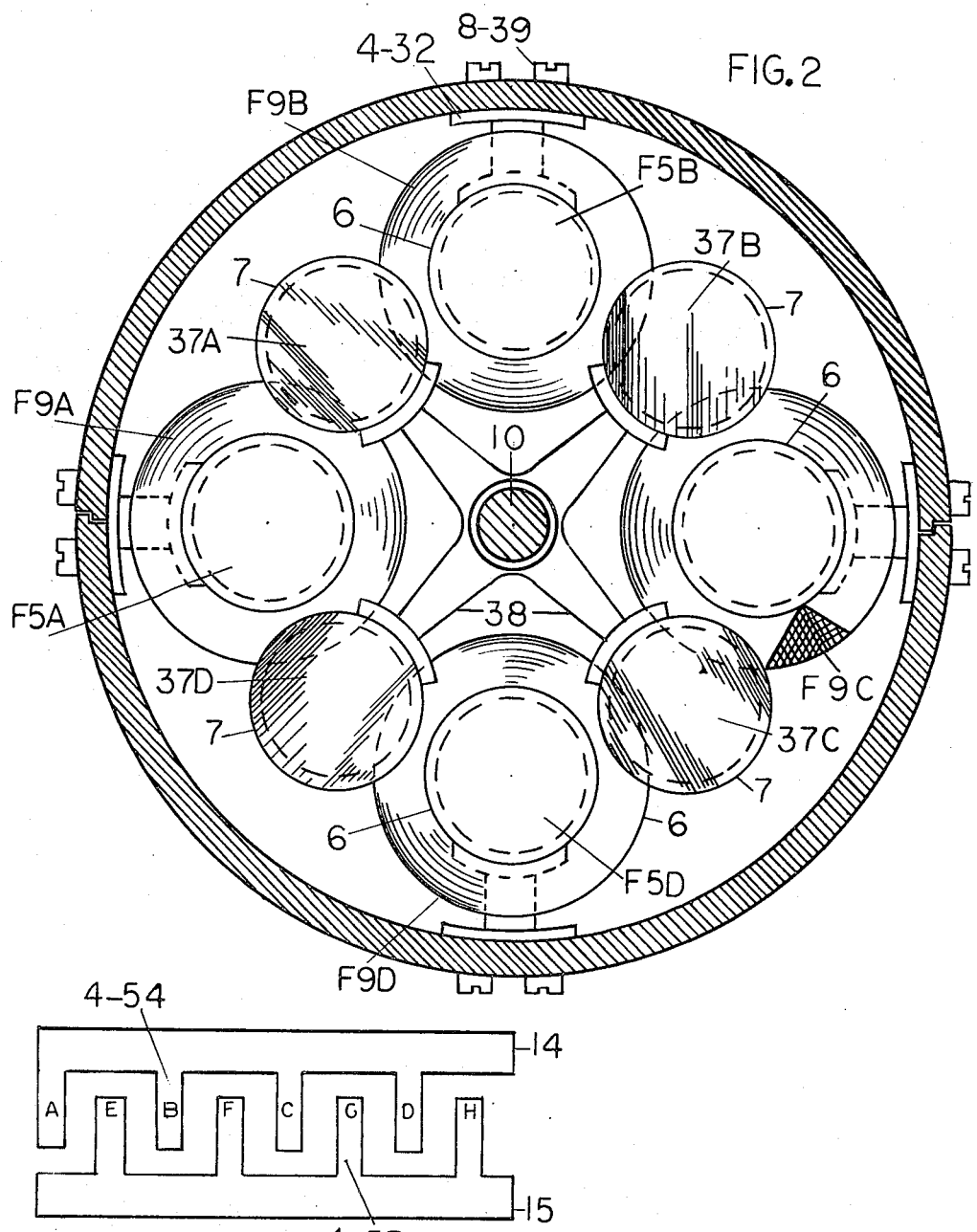
FIG. 2 is a sectional view showing the fore section stator poles with their gating coils. The rotor poles shown over and between the stator poles taken on line 2—2 of FIG. 7, minus the base.

Rotor 38, shown in FIGS. 1 and 2, is comprised of four identical permanent magnets 37, distributed at equal intervals of 90°. The hub and spokes are of high-tensile strength, non-magnetic metal. The rotor is secured to drive shaft 10, and held in position by tapered pin 74. The rotor magnetic pole 37 is made up of five segmented ceramic magnets similar to stator magnets A8 and F8. A thin coating of adhesive compound is applied to the face of each segment to complement the inherent bonding properties of these magnetized elements. Permanent magnet stack 37 is securely held in mantle 7 by the same adhesive process. Mantle 7, which is of a non-magnetic metal, is spot welded to rotor 38. The magnetic polarity of stack 37 is fixed as illustrated in FIG. 1. The north poles are facing aft stator poles A5's, while the south poles are facing the fore stator poles F5's. The power shaft 10 extends beyond the motor casing 1 and 2, through front bearing 12 and rear bearing 20. For and aft collars 13 position the rotor axially an equidistance between the fore and aft stators.

The air gap is held to one thirty-second of an inch between rotor magnet 37, and gating coil cores A5 and F5. The rotor magnet 37 is precisely aligned with stator poles A5 and F5, and held aligned by tapered pin 40.

CONSTRUCTION OF THE GATING MODULE

Figure 3:
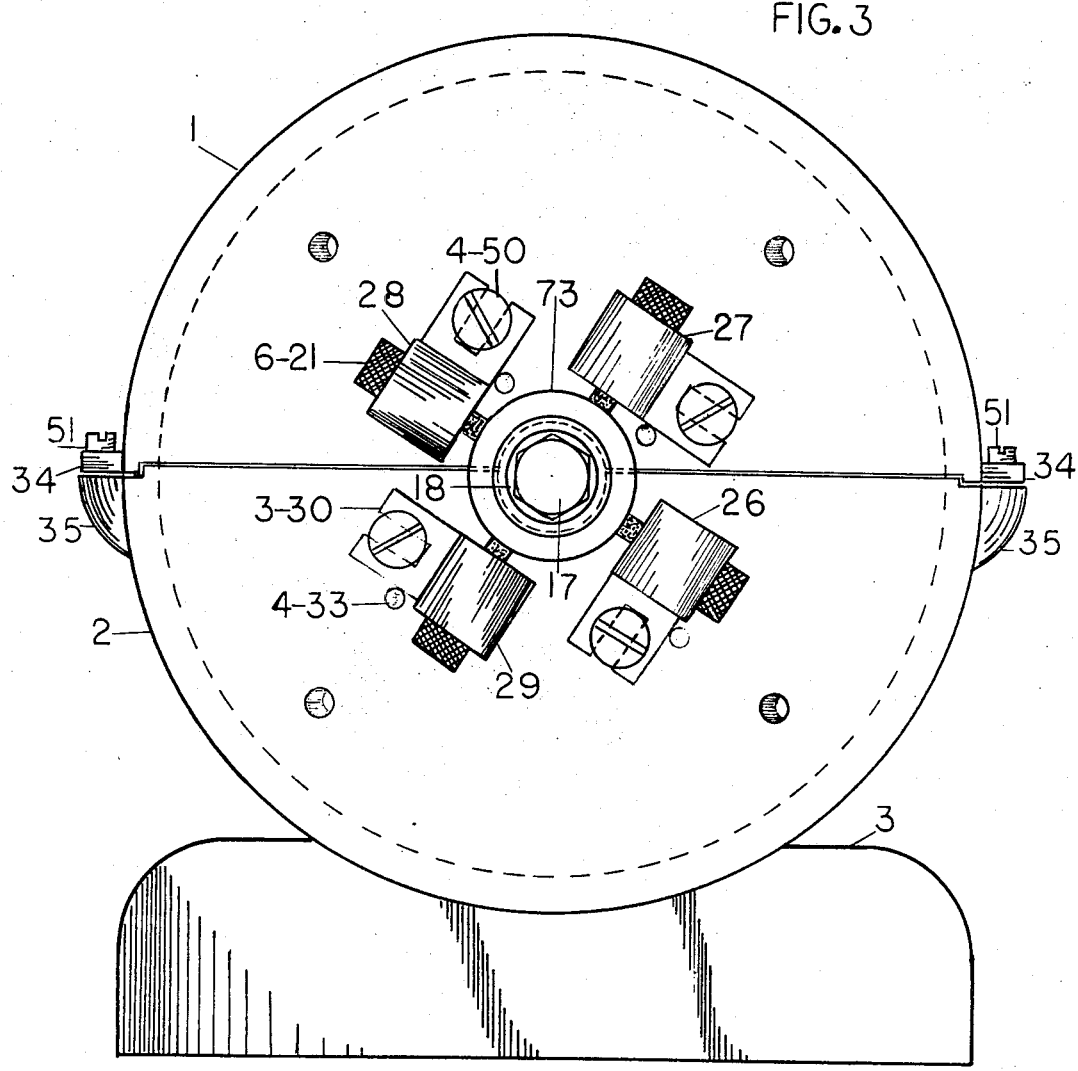
FIG. 3 is the aft end view of the motor with gating module cover removed showing the end plan view of the brush holders and the gating module.
Figure 14:
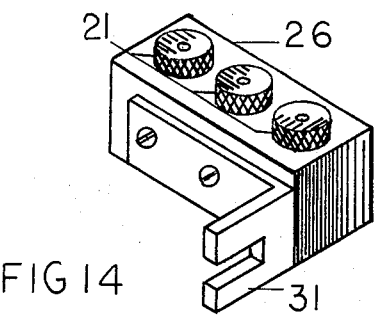
FIG. 14 depicts a triple brush holder.
Figure 15:
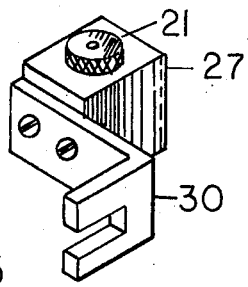
FIG. 15 depicts a single brush holder.

The construction of the gating module 73, embodying my invention, is best seen by referring to FIGS. 1, 3, and 4, wherein the main structural element 16 is made of a high temperature, high tensile strength plastic material, having a bore through its longitudinal axis to receive power shaft 10. Copper slip rings 14 and 15 are inlaid into each end of 16, with gating segments 53 e–f–g–h which are an integral part of slip ring 15, and gating segments 54 a–b–c–d an integral part of slip ring 14, interlaced around the periphery of 16 as illustrated in FIGS. 1, 5, and 15.

Gating module 73 is secured to the power shaft 10 by bolt 17, and locked in a precise position by key 19 and washer 18. The gating module periphery between slip ring 14, and slip ring 15 is divided into 16 equal segments, eight conducting and eight non-conduction segments as shown in FIGS. 4,5,6, and 13. A 45° center angle shown in the concentric circle FIG. 8, with the radii inscribing two right angle triangles of 22.5° each. The right half-angle sector constitutes the conducting gating segments 53 or 54. The left angle sector constitutes the non-conducting segment 16.

Sector AOB plus BOC in FIG. 8 contain the necessary gating elements for one positive half-cycle energization of gating coils A9 and F9; COD plus COE contain the elements for the negative half-cycle energization of coils A9 and F9. the result of this action is indicated by the first cycle square wave form in FIG. 8–1.

DESIGN OF BRUSH HOLDERS

In FIGS. 1, 3, 14, and 15, the construction and positioning of brush holders are illustrated in detail. There are three single brush holders, 27, 28, and 29, constructed of high temperature plastic, having a hole through their center to receive brass tube 22, compression spring 36, and carbon brushes 59, 60, and 61. The brushes are held against the gating segment by tension spring 36 and screw cap 21. Brush holder 26 is a triple unit, comprising of positive slip ring brush 58, negative slip ring brush 57, and gating brush 62. Conductors 44, 45, 46, 47, 48, and 49 are fed through screw caps 21 and terminated in brass contact washer 23. The brush holders are distributed around the periphery of gating module 73, at an interval of 90°. The positioning of the brush holders are made adjustable by set screw 50 and guide post 33. Starting with brush holder 28, and progressing in a clockwise direction, the brush holder 28 is located 33° past the center of fore and aft stator poles, A5a and F5a, at the 0° or starting position. The leading edge of brush 59 is set directly on radial line OC,which is tangental to stator pole F5a, as shown in FIG. 8, at 22.5° past the center. The holder is secured to aft end motor casing 1, with screw 50. Brush holder Bh27 is located 123° from the 0° starting point and 33° past center of fore stator pole F5b at the 90° position. The leading edge of brush 60, is set directly on radial line OG, FIG. 8, and is tangental to fore and aft stator poles A5b and F5b at 112.5° in a clockwise direction. The holder is secured to aft end, motor casing 1, with set screw 50. Brush holder 26 contains slip ring brushes 57, 58, and gating brush 61 and is positioned at 213° in a clockwise direction, 33° past the center of fore and aft stator poles, A5c and F5c positioned at 180°. The leading edge of gating brush 61 is set on radial line OK and is tangental to fore and aft stator poles A5c and F5c at 202.5° in a clockwise direction, as shown in FIG. 8. The holder is secured to aft end motor casing 2 with screw 50. Brush holder 26 is located at 303° past center of fore and aft stator poles A5d and F5d, positioned at 270°.

The leading edge of brush 62 is set on radial line OP, and is tangental to fore and aft stator poles A5d and F5d, positioned at 292.5° as shown in FIG. 8, 22.5° past the center of stator pole A5d and F5d. The holder is secured to aft end motorcasing 2 with screw 50.

GATING AND CONTROL SCHEMATIC

In FIG. 4, the electrical schematic for gating and speed control of the motor illustrated in FIGS. 1 and 16, is shown connected to a center tapped battery 75. The double pole single throw main switch 63 is connected to pins 66, 67, and 76 of the input power receptacle 77. Pin 64b is connected to the positive gate control variable resistor 56, then through conductor 45 to positive slip ring brush 58. The negative side 63a of the main switch 63 is connected to variable resistor 55 negative gate control; then through conductor 44 to negative slip ring brush 57. The fore and aft gating coils are connected in parallel in all four quadrants, as shown in FIGS. 1 and 4. Starting with the 0° and advancing in a clockwise rotation, we have the following brush coil combination: Brush 59 through conductor 46 to gating coil A9a–F9a; brush 60 through conductor 49 to gating coil A9b–F9b; brush 61 through conductor 48 to gating coil A9d–F9d. The return path for all eight gating coils, 9s, is through conductor 43 to input receptacle pin 65. Excessive arcing at the brushes is prevented by two center tapped resistors 72 and 71, as seen in FIG. 4. Resistor 72 is connected across brushes 60 and 62. Resistor 71 is connected across brushes 59 and 61. The center top of both resistors 71 and 72 is connected to the common return conductor 43. In the running mode the gating and ungating of all eight coils are simultaneous, whether the gating is positive or negative.

A simplified schematic of the motor sectional view taken on line 2—2, FIG. 7, comprising the fore section stator assembly, rotor 38, and a partial schematic of gating module 73, as seen in FIG. 8. The fore stator poles F5a through F5d are shown arranged at 90° intervals in the same sequence of order as in FIG. 2, with their diameter resting on the outer ring 25 of a concentric circle, while the inner ring 24 contains the simplified schematic of the gating module 73. The rotor poles 37a–b–d– are shown in an inter-polar position, which in a no-load power-off condition could be a natural position for the rotor to come to rest, due to the presence of a small percentage of flux from permanent magnet stack 8.

In the foregoing statement we assumed that the motor is in a quiescent state. With that, we shall proceed to apply power from battery 75, through power input receptacle 76 in FIG. 7, by placing switch 63 in an ON position and advancing speed controls 69 and 70. The action resulting from the closure of main power switch 63 will be followed through to each affected component in schematic drawings, FIGS. 4 and 8. The negative voltage path is through rheostat 55, conductor 44, to slip ring brush 57 to negative slip ring 15. The positive voltage path is through rheostat 56 conductor 45 to slip ring brush 58 to positive slip ring 14. Now turning to FIG. 8, it will be seen that the inner circle 24, representing gating module 73 is divided into eight 45° sectors. Each sector contains two 22.5° sectors, of which the leading sectors contain the positive gating segment 54a–b–c–d,and the negative gating segments 53e–f—h distributed around the periphery of circle 24 at an interval of 45°, the angular dimension of the conducting and non-conducting segments comprising the eight sectors. These sectors alternately inscribe a stator and a rotor pole within isosceles triangles A'OC', C'OE', and EOG. Furthermore, it will be noted that acute angle O, of isosceles triangle AOC, contains positive gating segment 54a and non-conducting segment 16. The leading edge of positive segment 54a, and the leading edge of gating brush 59 are set on line CO to the base of right angle triangle BOC, and is tangental to the leading edge of stator pole F5a at 22.5° past the center of the stator pole. Triangle C'OE' inscribes rotor pole 37a, and two right angle triangles COD and DOE negative gating segment 53e leading edge is in line with base line OE of triangle DOE, its trailing edge resting on line DO hypotenuse to triangles COD and DOE. Isosceles triangle E'OG' inscribes stator pole F5b and two right angle triangles EOF and FOG, wherein positive gating segment 54 b, with its leading edge resting on line OG, and in contact with brush 60, whose leading edge is also on base line OG of triangle FOG. There are two momentary break and make switches 63c and 63d; 63c connected in series with brush 59 and gating coil F9a; 63d is connected in series with brush 61 and gating coil F9d. The two gating coils are located opposite each other; F9a is at 0° position, while F9d is at 180° position. Switch 63c and switch 63d are parts of main switch 63, and are arranged to present a 7.4° delay in closing, after main switch 63 has been actuated. By referring to FIG. 8, our immediate concern is stator pole F5a, rotor pole 37a, and stator pole F5b. As seen in the drawing, rotor pole 37a is between stator poles F5a and F5b. It is also observed that a broken line 78 is passing through stator pole F5 b, 7.5° inside, in the direction of rotation from the side OE' of isosceles triangle C'OE'. As previously stated, the motor is in a static unenergized condition. Therefore, upon the actuation of main switch 63, gating current is applied to gating brushes 60 and 62 through positive gating segments 54a and 54c to gating coils F9b and F9c. This positive gating produces unlike magnetic fields between stator poles A5b, F5b and A5d, F5d, and rotor poles 37a and 37c, causing rotor 38 to rotate in a clockwise direction. In the meanwhile, stator poles A5a, F5a, and A5c, F5c are repelling rotor poles 37a and 37c, due to the presence of leakage flux of like polarity from permanent magnet stack 8. Swtich 63c and 63d is in open position until rotor pole 37a and 37c are 7.5° inside stator poles A5b, F5b, and A5d, F5d, as indicated by broken line 78. As the momentary switch 63c and 63d closes,gating coils A9a, F9a, and A9c, F9c will be positively gated by positive gating segment 54c, 54d, and brush 59 and 61. Thus, with all eight stator poles positively gated, the rotor poles will advance radially on rotatable shaft 10 between fore and aft stator poles until the leading edges of the rotor poles have reached broken line 79 gating cut-off point as shown in FIG. 8. Upon gating, rotor pole 31a and gating segment 53c advances 45° from interpolar position to an in line position with stator pole F5b; this movement is indicated by solid line and broken line arrows 80 and 80a. Positive gating segment 54a, which in turn moved to interpolar position as indicated by broken line arrow 81a. Simultaneously, rotor poles 37b, 37c, 37d and all positive and negative gating segments advanced 45° as indicated by broken line arrows. The resultant wave forms due to positive gating is illustrated in FIGS. 8-1. As the leading edge of rotor pole 37a and the three other rotor poles have advanced between the fore and aft stator poles to the position indicated by broken line 79 over the pole face of stator pole F5b, simultaneously positive gating segment 54a has broken contact with gating brush 60, positive gating segments 54b,54c, and 54c have likewise broken contact with their respective brushes. Then follows a 3° advance of rotor 38 to the position as indicated by line OG base of triangle FOG. This is the ungated period of the gating coils. During this period the rotor poles are between and aligned with the stator poles as seen in longitudinal sectional view FIG. 1. The 45° advance of rotor 38 places negative gating segment 53e on line OG and in contact with brush 60; negative gating segment 53f is in contact with brush 61 as indicated by broken line arrow 82a; negative gating segments 53g and 53h are in contact with brush 62 and 59, as indicated by broken line arrows 84a and 86a. This is the beginning of the negative gating phase, when the magnetic polarity of all eight gating coils are reversed and the magnetic induction produced by permanent magnet stacks 8, and the flux produced by the gating current in core 5, becomes additive and presents a strong repelling force between the stator and rotor poles. The force of repulsion remains until the rotor poles trailing edge has travelled past broken line 79. With that, these alternate positive and negative gating sequences are repeated eight times per revolution as illustrated in gating wave form, FIG. 8-1.

A simplified functional schematic shown in FIG. 16, distinguishes from the embodiment shown in FIGS. 1, 2, and 4, only by the placement of the stator and rotor poles into a coaxial configuration wherein four permanent magnets, stack 8, housed in pod 6, and joined with gating coil 9 and core 5 distributed circumferentially at an equidistance of 90°. The poles longitudinal axis being orthogonal to the direction of rotation and the stator pole faces concavely formed, whereas, the pole faces of rotor magnets 37 are convex.

The gating coils are connected indentically, and to identical points as shown in FIG. 4. The function and physical characteristics of gating module 73 remains the same and identical with the description given in the preferred embodiment of my invention in FIG. 1.

Figure 17:
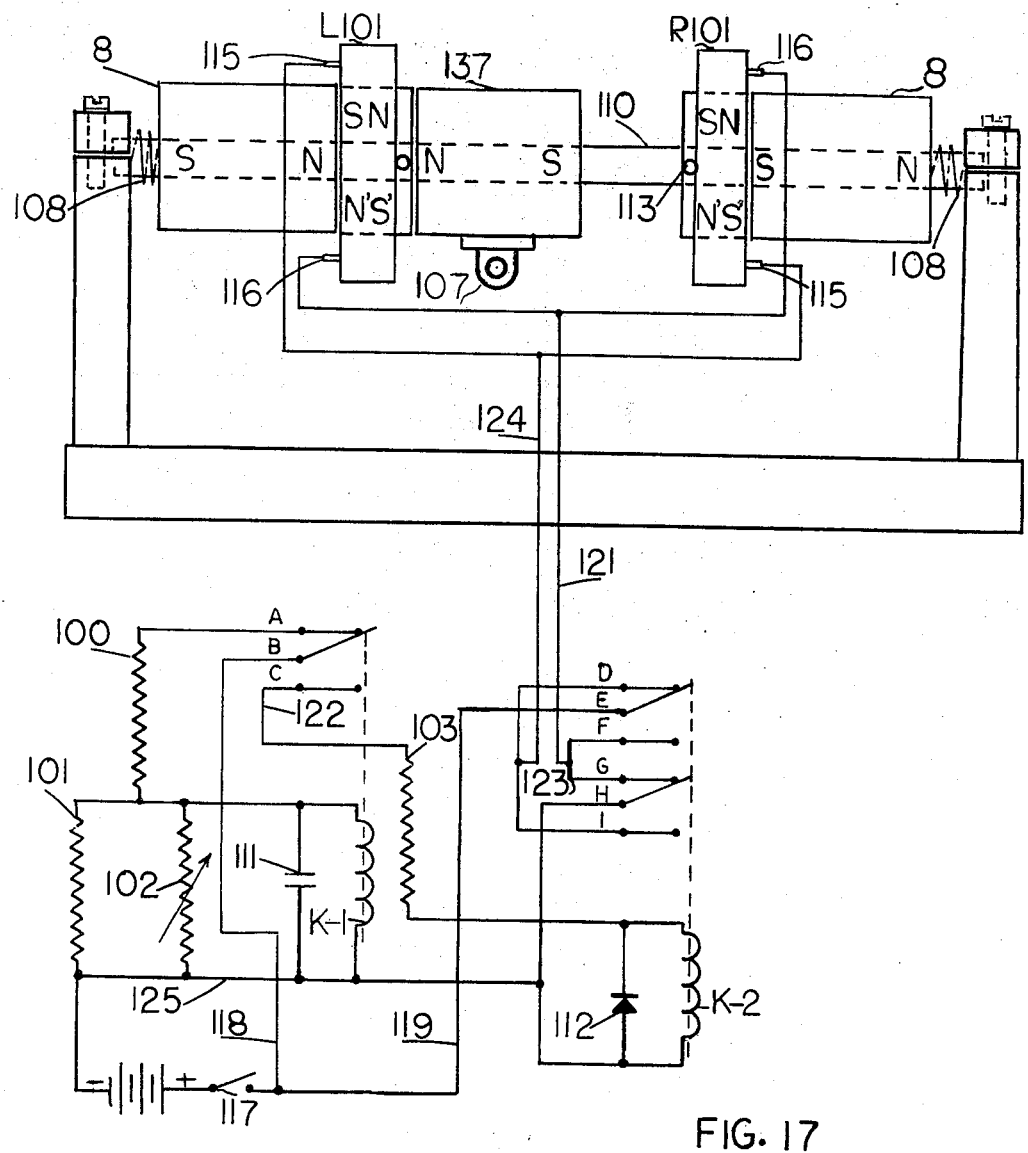
FIG. 17 depicts a gated permanent magnet push-pull reciprocating motor and its gating and control circuitry.

Another embodiment of my invention is shown in part in FIG. 17, wherein two gated hybrid permanent magnet stators, R101 and L101, are placed at the opposite ends on shaft 110. Soft iron cores 5, of L101 and R101 are secured to shaft 110 by tapered pins 113, while permanent magnet stack 8 of R101 and L101 are allowed to move along the longitudinal axis to a distance of three-sixteenths of an inch toward and against compression springs 108. The purpose of this action is to reduce the counter magnetic induction in core 5 of stator pole R101 when stator L101 is in the repulsion mode and stator pole, R101, is in the attraction mode and vice versa. Stators L101 and R101 are comprised of identical components employed in the preferred embodiment of my invention described in FIGS. 1 and 2. Between stator poles L101 and R101 is located the permanent magnet armature 137 similar to rotor pole 37 in FIG. 1, and is made moveable in a reciprocal motion along the longitudinal axis by the repelling and pulling interaction between armature 137 and stator poles L101 and R101.

As in FIG. 1, the magnetic polarity of permanent magnet stack 8 is fixed. The magnetic polarity of stack 8 ( of L101), adjoining core 5 of L101 has a north polarity, while stack 8 of R101 adjoining core 5 has a south polarity. The polarity of armature 137 is also of a fixed polarity. The pole face of armature 137 adjacent to core 5 of stator L101 has a north magnetic field, while the armature end facing core of stator R101 has a south magnetic field.

OPERATION AND CONTROL

Relay K-1 and K-2 comprise the major elements of the control circuitry of FIG. 1y. Relay K-1 is a single pole, double throw relay, which in conjunction with its associated components, is designed to operate as a relaxation oscillator. Double pole, double throw relay K-2 functions as a current reversing switch for gating coils 9. For the purpose of simplicity, the control circuitry is connected to a battery for power source. Upon the closure of power switch 117 through conductor 118, current is conducted to contact "b" of K-1 and through conductor 119 to contact "e" of K-2. As will be noted, relay K-2 is in a normally closed position and "e" is in contact with "d," it is also evident that contact "d" through conductor 120 is tied to binding post 116 of gating coil 9 of L101, and to binding post 115 of gating coil 9 of R101, and to contact "i" of K-2. The current path is through the gating coils to lower binding post 115 and 116, through conductor 121 and 123 to relay contact "g" to "h," then through conductor 125 to ground. Due to this action, core 5 of L101 is magnetized such as to produce a south pole designated S, adjacent to permanent magnet stack 8 of L101, and a north pole designated N at the outer end of core 5 of L101. Simultaneously the opposite stator pole R101 will have opposite polarity as indicated by N'S'.

Since stator pole L101 and armature 137 are of like polarities, therefore the two poles are repelling, causing armature 137 to move away from pole L101 toward stator pole R101. However, the current through coil 9 of R101 is in the reverse direction which presents an unlike pole N'S' to the approaching (S) south pole of armature 137. Thus, while one of the poles is repelling, the other is attracting the armature. Now, as we look at R101, we see that we have two like interpoles S' and S; therefore, stack 8 of R101 is repelled to three-sixteenths of an inch against compression spring 108. Let us return to relay K-1; while the armature 137 is moving toward R101, through contact "a" of K-1, current is being applied to limiting resistor 100, time constant forming resistor 101, 102, condenser 111, and to the relay coil. Upon the charging of condenser 111, K-1 becomes energized, causing the relay armature to move from contact "b" to contact "c," energizing relay K-2. In the energized state relay armature "e" and "h" break contacts with "d" and "g," and make contact with "f" and "i". This action reverses the direction of current in the stator coils, which in turn reverses the magnetic polarity of the soft iron cores in both stators L101 and R101. This action in turn reverses the travel of armature 137 back to its starting position. With the discharge of condenser 111, the cycle repeats itself per setting of variable resistor 102. The optimum operating point will ba ovtained with the setting of the oscillator frequency for a 50/50 duty cycle output.

Although several preferred embodiments of the invention have been described and illustrated in the above specifications, it shall be understood that the number of stator section and stator poles, rotor section and rotor poles may be increased, and used in a cascade configuration where large horse power requirements exist, and various modifications and changes may be made in the motor without departing from the spirit and scope of the invention, as set forth in the appended claims.

What I claim is:

1. A gated permanent magnet motor wherein 50 percent of the required force to do a specific amount of work is derived from the peak energy product of the permanent magnets, said motor comprising fore and aft stator sections, comprising at least four hybrid annular stator poles per section, said stator poles consisting of seven segmented annular permanent magnets joined with a high permeability iron core of equal diameter and fitted with an annular coil to form a series hybrid magnetic pole, said stator poles are distributed circumferentially at opposite ends within the motor casing at 90° intervals with the pole end bearing the coil, placed opposite each other, but separated by an appropriate distance to receive a rotor comprising a non-magnetic hub having four radially extending spokes, spaced at an interval of 90° with means to support four stacks of annular permanent rotor poles having their longitudinal axis orthogonal to the path of rotation, said magnets being identical with the stator magnets but containing only five segments per pole, a shaft extending through and beyond the fore and aft motor bearing and having means to retain and lock the rotor and rotor poles in a precise axial and radial alignment with the stator poles, said rotor is made rotatable on the said shaft between the fore and aft stator poles either in a clockwise or counter clockwise rotation, said shaft having means to receive and retain a cylindrical shaped gating module comprising a high temperature, high strength plastic core locked in a synchronized position by mechanical means on the aft end of the rotor shaft in a corotational alignment with the rotor poles such that the leading edge of the positive gating segments lead the leading edge of the rotor poles by 45°, while the leading edge of the negative gating segments trailing the positive gating segments by 22.5° and are in a precise corotation alignment with the leading edge of the rotor poles, said core being inlaid with copper slip rings on both ends, said slip rings having inwardly projecting conducting segments alternately interlaced aroung the periphery of the cylinder with eight conducting and eight non conducting segments, said slip rings driven by the rotation of the shaft are in constant contact with positively and negatively energized brushes located 213 degrees in a clockwise direction and held there in a brush holder, means for coupling and controlling a source of alternate half cycle or DC voltage input continuously during the operation phase, at least four gating brushes circumferentially distributed at an equidistance of 90° around the periphery of the gating module and held in a precise position in their respective brush holders such that the leading edge of each brush is in a tangental position at 22.5° past the center angle of their respective stator poles, said brushes are alternately and simultaneously energized and electrically connected to an axially opposite pair of gating coils, with each 42° of rotation of the gating module, all eight gating coils are positively excited off for 3°, then negatively excited for 42° of rotation, then again off for another 3°; this process of on and off gating is repeated eight times for each revolution of the rotor, the continuous and sequential on and off gating of the said gating coils produces a reciprocal polarity reversal in the stator magnetic field such as to rotatively drive the said permanent magnet rotor.

2. A gated permanent magnet motor differing from the motor described in claim 1, only by the difference in stator rotor configuration, said motor having at least four hybrid stator poles distributed radially around a coaxially placed rotor, said rotor comprising four permanent magnet rotor poles distributed circumferentially at 90° intervals on a nonmagnetic hub, said hub being made rotatable on a center shaft, said shaft having means to retain and synchronously lock in position said gating module described in claim 1.

3. A gated push-pull axially reciprocating permanent magnet motor comprising at least two hybrid stator poles described in claim 1, spaced apart and axially mounted on opposite ends of said supporting shaft, said permanent magnet armature described in claim 1 is placed between said stator poles and spaced for reciprocating movement along the longitudinal axis, said armature having means for coupling to an appropriate load, the gating coil part of said stators are permanently fixed in position and secured to said shaft, the permanent magnet part of said stator poles are allowed a limited longitudinal movement away from the gating coils during the positive gating phase.

4. A gated push-pull axially reciprocating permanent magnet motor as set forth in claim 3, wherein the circuit control means comprises a single pole double throw relay, said relay in conjunction with its associated circuit components integrated into a variable frequency relaxation oscillator with selective duty cycles, the output of said relay is coupled to the drive coil of a double pole double throw relay having a normally closed position, the two armatures of the said relay having been connected such that one armature will always be of positive polarity, while the second armature will always be of negative polarity, thus the said relay being responsively connected to the said oscillator, will alternately reverse the magnetic polarity of the opposite stator poles synchronously with the oscillator frequency.

5. A gated permanent magnet motor as in claim 1, wherein the stator poles being of two parts containing a permanent magnet adjoined with a high-permeability electromagnetic inductor, the said poles arranged into two concentric rings and placed at opposite ends of said motor to form two stator sections separated by an airgap into which is placed a rotor containing plurality of permanent magnets placed equidistance around the periphery of the rotor and in line with the stator poles, the permanent magnets in said rotor and stator poles are arranged such that their opposite poles will always have like polarity and that the rotor and stator poles will be separated by electromagnetic inductors, said inductors in a nonenergized state acting as passive magnetic decoupling devices, wherein the magnitude of decoupling is directly proportional to the length and diameter of the core, by the selection of optimum length to diameter ratio, the repelling action between the rotor and stator poles is completely neutralized without the use of external energy, a state which enables the motor to operate in either one of two modes, namely, in a full power mode wherein both positive and negative gating are employed, or in a power conserving mode in which the power for positive gating is switched off and the motor operates as a modified repulsion motor.

6. A gated permanent magnet motor described in claim 1 in combination with a cylindrical shaped gating module comprising two segmented conducting rings designed as positive and negative gating segments and a nonconducting core recessed to receive said segmented rings, said rings having an even number of inwardly projecting segments determined according to the relation $$Ts = \frac{360°}{(\frac{1}{2}S_p + R_p)^2}$$

where $Ts$ = the number of conducting and nonconducting segments $Sp$ = the number of stator poles, $Rp$ = the number of rotor poles, the quotient of said equation = the arcuated span in degrees of each conducting and nonconducting segments, said equation applied to the motor in claim 3 gives the following:

$$-Ts = \frac{360°}{(\frac{1}{2}8 + 4)_2} = 22.5°,$$

then ½·16 = 8 conducting and eight nonconducting segments also ½·8 = 4 positive and four negative conducting segments each having an arcuated span of 22.5°, it is readily seen that $Ts$ is a variable quantity dependent on $(½S_p + R_p)_2$, said segments in combination with the gating brushes, whose arcuated span is 13.3 percent less than the conducting segment, said brushes in the starting and power mode of operation furnish their respective coils with alternate positive and negative excitation for an angular rotation of 42° on 3° off, 42° on 3° off for eight complete polarity reversals per rotation, said rings also include two continuously conducting regions with means for continuous connection to the positive and negative terminals of a three wire DC or alternate half cycle power source.

* * * * *